Dec. 12, 1961                R. C. GASMIRE                3,012,286
                      METHOD OF MAKING PLASTIC ARTICLES
Filed March 25, 1959                                    4 Sheets-Sheet 1

INVENTOR.
Richard C. Gasmire
BY
Mead, Browne, Schuyler & Burridge
ATTORNEYS

Dec. 12, 1961 R. C. GASMIRE 3,012,286
METHOD OF MAKING PLASTIC ARTICLES
Filed March 25, 1959 4 Sheets-Sheet 2

INVENTOR.
Richard C. Gasmire
BY
Mead, Browne, Schuyler & Beveridge
ATTORNEYS

Dec. 12, 1961 R. C. GASMIRE 3,012,286
METHOD OF MAKING PLASTIC ARTICLES
Filed March 25, 1959 4 Sheets-Sheet 3
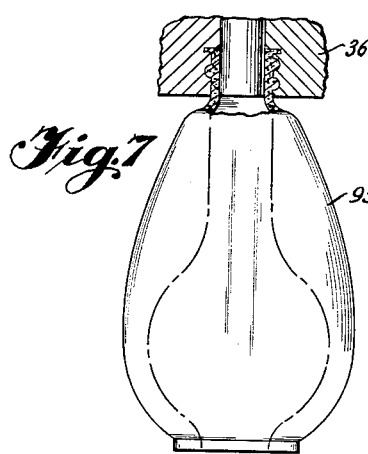
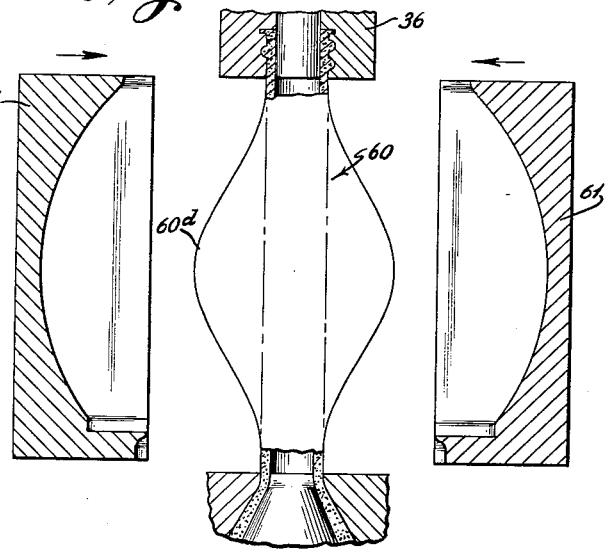
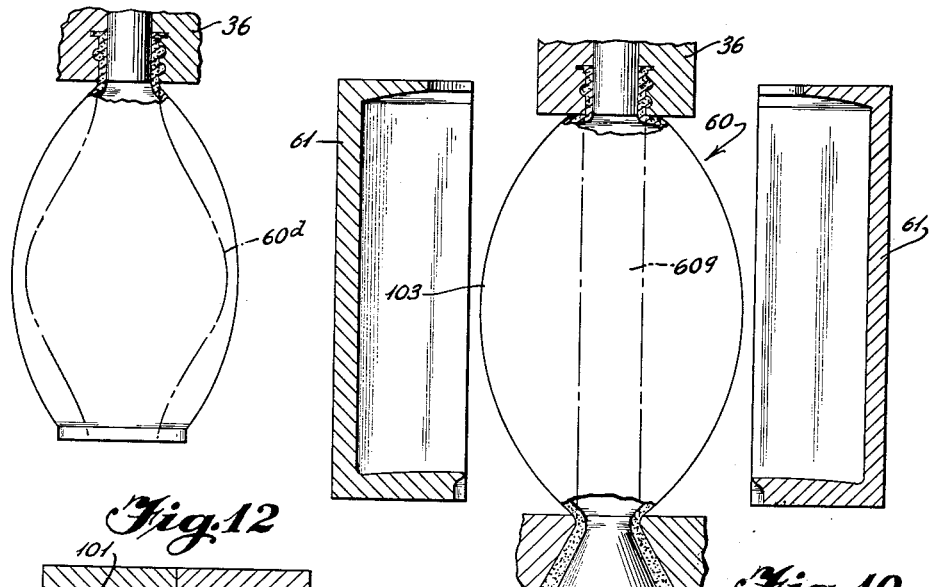
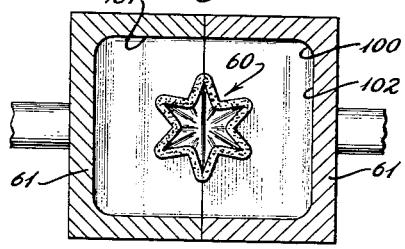
INVENTOR.
Richard C. Gasmire
BY
Mead, Browne, Schuyler & Beveridge
ATTORNEYS

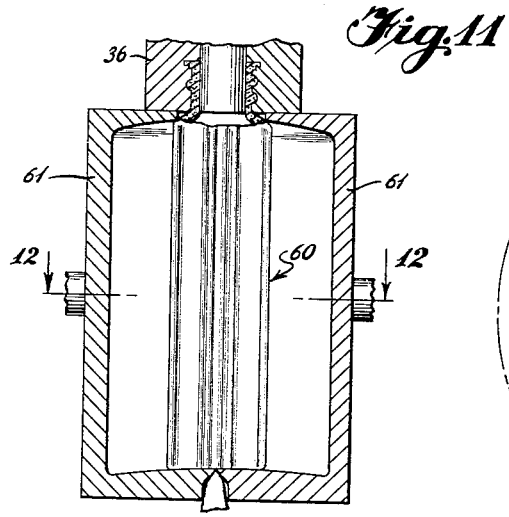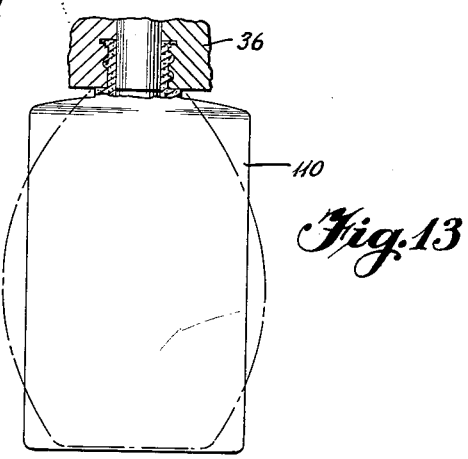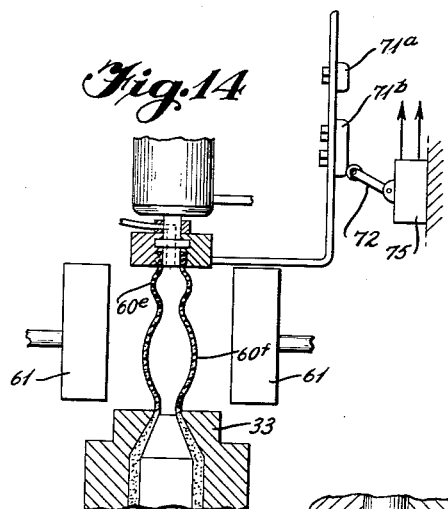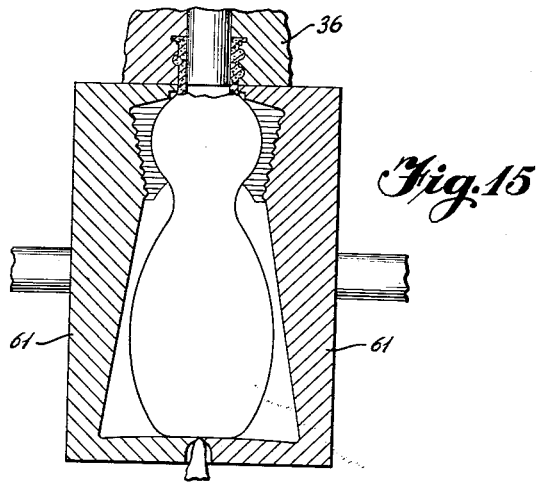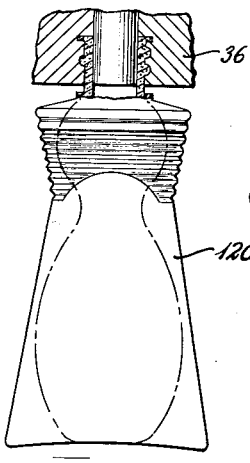

3,012,286
METHOD OF MAKING PLASTIC ARTICLES
Richard C. Gasmire, Toledo, Ohio, assignor to Owens-Illinois Glass Company, a corporation of Ohio
Filed Mar. 25, 1959, Ser. No. 801,776
21 Claims. (Cl. 18—55)

The present invention relates to a method of making plastic articles by a combined injection, extrusion and blowing process, and more particularly to the formation of a blank from which the major portion of a plastic container or the like is subsequently blown.

In the manufacture of plastic containers or the like articles, it has been proposed that a process be utilized which includes the steps of injection molding a finished article portion, such as the neck of a container, extruding a tubular portion to form a blank, and finally blowing the formed tubular blank to final configuration. In the blowing of any article, such as glassware, containers or the like, it is axiomatic that "the final article is only as good as the blank from which it is blown." Thus, it is vital that the blank be shaped and formed to insure the best possible material distribution in the final article, to provide sufficient material for final article strength without wasting material, and to accommodate rapid and efficient blowing of the blank to its final size and configuration in the finished article.

The present invention is concerned primarily with a method for the formation of a blank satisfying the exacting, but quite practical, requirements set forth above, while at the same time being economically feasible from an operational standpoint, i.e., capable of being carried out within a limited period of time constituting only a fraction of the complete forming cycle. The broadest aspect of the present invention may well be defined as residing in the provision of a blank "tailored" to the size and configuration of the article to be formed.

The process of the present invention is particularly adapted to the manufacture of plastic containers having a reduced neck portion and an enlarged body portion of regular or irregular configuration. In the manufacture of such containers, the previously proposed processes involved the blowing of the final article from a tube of substantially the same diameter as the reduced neck portion. In the blowing of irregularly shaped articles, such as containers of oval or elongated rectangular cross-sectional configuration, the tubular blank is expanded radially by blowing and therefore the expanding tube contacts those portions of the mold defining the minor cross-sectional axial dimension of the article prior to contacting the other portions of the mold defining the major cross-sectional axial dimension thereof. Since the chilling and initial setting of the plastic blank upon contact with the mold is substantially instantaneous, a progressive formation of the article walls has resulted with those parts of the article chilled by the first-contacted mold walls being of greater wall thickness than those parts of the article formed by the later contacting blank portions. Consequently, it has proved difficult to define irregularly shaped articles of uniform wall thickness and of uniform strength. These difficulties have been encountered in axially irregular articles as well as in radially irregular articles.

The present invention proposes a method for the formation of such irregularly shaped articles by modifying the shape of the normally tubular blank to a configuration more nearly conforming to that of the finished article. In other words, the present invention provides a means whereby the shape of the blank can be modified either axially or radially to conform more closely to the final article shape and the blow mold shape.

The heated and plasticized plastic material, preferably thermoplastic in nature, such as polyethylene, from which containers are preferably made by the present process, possesses sufficient strength and internal cohesion, even while in a plasticized condition and before setting to a rigid configuration, to accommodate substantial radial distention by inflating. Since the blank is extruded to the open air, a substantial chilling effect is obtained prior to the enclosure of the blank within the molds and those portions of the article blank most recently extruded from the orifice are the most susceptible to radial distention because of the greater plasticity and formability of these portions. This property may be well taken advantage of in the modification of the article blank in a manner to be hereinafter more fully described.

It is, therefore, an important object of the present invention to provide a method for a modification of a normally tubular blank from which a plastic article is subsequently blown by the inflation of the blank while it is still in plasticized, workable condition and prior to the enclosure of the blank within a blow mold.

Another important object of the present invention is to provide a method wherein a fluid medium is injected into a plastically deformable blank at a relatively low pressure to distend the blank radially prior to its enclosure within a blow mold.

It is a further object of this invention to provide a method wherein an extruded tubular blank has injected thereinto a gaseous medium at relatively low pressure to distend the blank radially outwardly, the greatest distention occurring in those most readily deformable portions of the blank.

Yet another object is a provision of a method for the modification of a normally tubular blank by radially distending the blank during the formation thereof and prior to enclosure of the blank in a blow mold, such modification conforming the blank in both size and configuration to the blow mold within which the blank is enclosed and subsequently blown.

Other objects and advantages of the invention will appear from the following detailed description taken in conjunction with the annexed drawings, in which:

On the drawings:

FIGURE 7 is a view similar to FIGURE 4 illustrating a container blown from the blank of FIGURE 6;

FIGURE 8 is a view of an additional modified blank prior to enclosure of the blank within the blow molds;

FIGURE 9 is a view of the final article blown from the blank of FIGURE 8;

FIGURE 10 is a view similar to FIGURE 8 illustrating yet another modified blank;

FIGURE 11 is a view similar to FIGURES 2 and 6 illustrating the enclosure of the blank of FIGURE 10;

FIGURE 12 is a sectional view taken on the plane 12—12 of FIGURE 11;

FIGURE 13 is a view of a finally formed article blown from the blank of FIGURE 10;

FIGURE 14 is a view similar to FIGURE 5 illustrating schematically another modified apparatus;

FIGURE 15 is a view similar to FIGURES 2, 6 and 11 illustrating the modified blank formed by the apparatus of FIGURE 14 enclosed within blow molds; and FIGURE 16 is a view of a final article formed from the blank of FIGURE 15.

As shown on the drawings:

Figure 1:
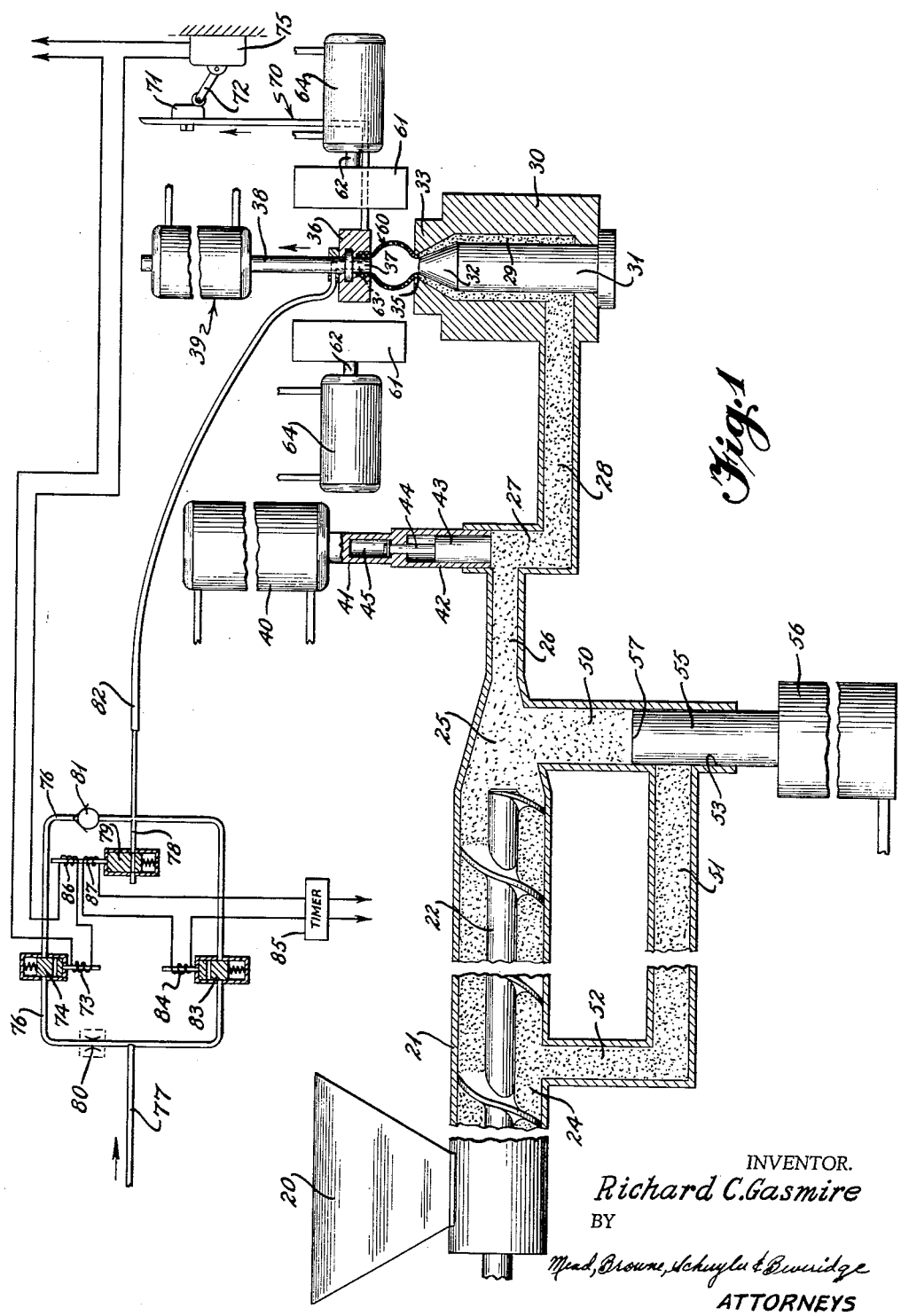
FIGURE 1 is a schematic view of an apparatus for carrying out the method of the present invention.

In FIGURE 1, a thermoplastic material, preferably polyethylene in the form of pellets, is introduced into a supply hopper 20 communicating at its lower end with a horizontally disposed, generally cylindrical plasticizing chamber 21 within which is disposed a coaxial, elongated plasticizing and extruding screw 22. The screw is power-driven (by means not shown) by rotation about its longitudinal axis and the lead of the screw 22 feeds the granulated or pelletized plastic material through the plasticizing chamber 21. The plasticizing chamber is surrounded by suitable heating elements, such as electric resistance heating coils (not shown), and the combination of heat and pressure, supplied by the helical thread of the screw 22, is sufficient to reduce the pelletized thermoplastic material to a fluid state by the time the material has traveled to a medial portion 24 of the chamber 21.

Thermoplastic material in a fluid state issuing from the extruder and plasticizer screw 22 is conducted through a tapered outlet portion 25 and a longitudinal conduit 26 through a vertical conduit portion 27 communicating through a longitudinal passage 28 with a vertical tubular extrusion chamber 29 cooperatively defined by an orifice block having an exterior cylindrical chamber wall 30 and an interior core 31 having a tapered upper portion 32 cooperating with a similarly tapered portion 33 of the wall 30 to define a restricted annular extrusion orifice 35.

Superposed over the orifice 35 is a neck or finish mold 36 having a central core 37, the mold 36 and the core 37 being carried by the actuating rod 38 of an upper fluid pressure actuated cylinder 39.

In alignment with the vertical conduit portion 27 is a fluid pressure actuated cylinder or motor 40 having a depending actuating rod 41 and carrying, at its lower end, a depending tubular sleeve valve 42 insertable into the vertical conduit 27, as illustrated in FIGURE 1, when the motor 40 is actuated to extend the actuating rod 41 downwardly. Slidably disposed interiorly of the sleeve valve 42 is a cylindrical injection piston 43 having a reduced actuating stem 44 slidably inserted in an internal recess 45 of the rod 41. The resulting lost motion between the sleeve valve 42 and the injection piston 43 permits the initial insertion of the sleeve valve 42 into the passage 27 to interrupt communication between the passage 27 and the longitudinal conduit 26, followed by later insertion of the injection piston 43 into the vertical passage 27 for a purpose to be hereinafter more fully described.

The tapered extruder outlet 25 communicates with a recirculation passage disposed exteriorly of the cylindrical plasticizing and extruding chamber 21 and comprising a first vertical portion 50 communicating with the tapered outlet 25 of the chamber 21, a second horizontal portion 51 communicating with the vertical portion 50, a second vertical portion 52 communicating with the passage 51 and with the medial portion 24 of the extruding and plasticizing chamber 21.

Normally disposed in a vertical extension 53 of the vertical portion 50 of the recirculation conduit is a combination recirculation and extruding piston 55 adapted for actuation upwardly into the conduit portion 50 by a single acting fluid pressure actuated cylinder 56.

When the apparatus of FIGURE 1 is in its at rest position (not shown), the level of thermoplastic material in the extrusion chamber 29 is substantially that of the extrusion orifice 35, and the apparatus is substantially full of material with the valve sleeve 42 being in its actuated or dependent position at which it interrupts communication between the plasticizing chamber 21 and the extrusion chamber 29. Due to rotation of the combined plasticizer and extruder screw 22, substantial pressures will be generated within the conduit portions 50 and 26, which pressures will be effective on the end face 57 of the piston 45 to fully depress the piston to its non-actuated position, i.e., a position at which recirculation is accommodated between conduits 50 and 51.

Consequently, material delivered under pressure by the combined extrusion and plasticizing screw 22 will be recirculated through the recirculation passage and a continuous circulatory flow of fluid plasticized material will result. No substantial output pressure will develop other than that necessary to depress the piston 55 against whatever back pressure exists in the cylinder 56. The entry of recirculated material into the medial portion 24 of the plasticizing chamber 21 will hold back the incoming flow of particulated material from the hopper 20, and the particulated material sliding upon the helical screw head and the pressure of the already fluid, plasticized material recirculating through the recirculation passage prevents the feeding of fresh particulated material by the screw.

It will further be noted from FIGURE 1 that the neck mold 36 is in full communication with the extrusion orifice 35 and subsequent actuation of the cylinder 40 to depress the ejection piston 43 will inject plasticized material from vertical passage 27, the horizontal passage 28 and the chamber 29 into the neck or finish mold 36. Thus, a finished portion of the plastic article, i.e., a bottle neck illustrated in the preferred embodiment of the invention, will be injection molded by the passage of material under pressure into the neck mold. This stage of operation will be maintained until such time as the injection molded portions have been chilled or set sufficiently by their contact with the relatively massive elements 36 and 37 to assume a more or less set condition.

Next, the cylinder 40 is actuated vertically upward to withdraw both the sleeve valve 42 and the injection piston 43, thus re-establishing communication between the plasticizing chamber 21 and the extrusion chamber 29 and establishing the full communication of fluid plasticized material from the outlet end 25 of the plasticizing and extrusion screw 22 to the annular extrusion orifice 35. At this time, the cylinder 56 is actuated to displace the extrusion piston 55 vertically upwardly into the conduit portion 50.

Upon the establishment of communication between the plasticizing and extruding screw 22 and the extrusion orifice 35 and upon upward actuation of the extrusion piston 55, material under pressure will be extruded through the interconnecting passages and conduits 26, 27, 28 and 29 and hence through the open annular extrusion orifice 35 in an upward direction. At the same time, the cylinder 39 is actuated to retract the piston 38, the neck mold 36 and the neck mold core 37 vertically upwardly to the relative position illustrated in FIGURE 2 of the drawings. The material expressed by the combined output pressures of the extruder-plasicizer 32 and the piston 55 will be expressed thorugh the orifice 35 in the form of a tubular, although not necessarily cylindrical, extension of the material filling the neck mold and this tubular formation, integral with the previously injection molded finish, will be exposed above the orifice 25.

After the injection molded finish has been moved vertically to an extent sufficient to extrude a tube of the desired length, actuation of the piston 38 ceases and cylinder 40 is again actuated to reinsert the valve sleeve 42 into the conduit 27 to again interrupt communication between the tapered extruder plasticizer output passage 25 and the orifice 35. Thus, the valve 32 again interrupts extruder-orifice communication, and the output end of the extruder-plasticizer has been segregated from the orifice 35. Since the piston 55 is now in its upper position and since the continued operation of the screw 22 generates substantial pressures within the outlet passage 25, such pressures will be exerted upon the end face 57 of the piston 55 and will tend to depress the piston 55 vertically downward. When the piston 55 has been urged downwardly sufficiently to uncover the communication between the conduits 50 and 51 of the recirculation passage, recirculation will be accommodated, and the pressure output of the extruder-plasticizer will be vented through passages 50, 51 and 52 to the medial point 24 of the extruder-plasticizer.

Figure 2:
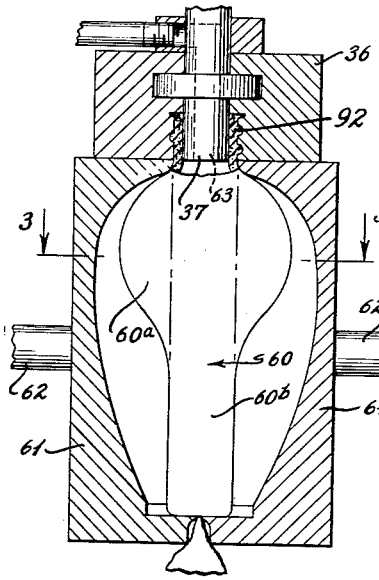
FIGURE 2 is an enlarged vertical sectional view taken through the injection and blow mold of FIGURE 1 illustrating the contour and size of the modified blank.
Figure 3:
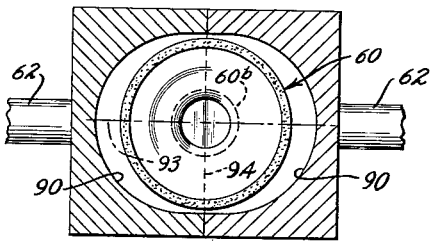
FIGURE 3 is a sectional view taken on the plane 3—3 of FIGURE 2.

Next, as illustrated in FIGURE 2 of the drawings, complementary blow mold halves 61 are closed upon the exposed tube 60 by actuation rods 62 connected to a suitable source of pressure, such as fluid pressure cylinders 63. Closure of the mold sections 61 will pinch the lower end of the tube therebetween, thereby forming a closed bottom for the tube section defined by the cooperable neck mold 36, 37 and the blow molds 61. Next, fluid under pressure is introduced into the closed tube, as through fluid pressure line 63 extending axially through the neck mold core 37 and the tube 60 is blown to its final configuration against the interior walls of the blow mold sections 61.

To fully complete the operating cycle, the neck mold and blow molds are open to release the finished bottle, the neck mold 36 or 37 are lowered to their illustrated position in FIGURE 1, and the injection molded portion of the next article is formed as heretofore described by displacement of the injection piston 43.

Incorporated in and forming a part of the apparatus for retracting the neck mold 36 is a bracket 70. This bracket carried an adjustable actuating cam 71 which is contactible with an actuating arm 72 for a limit switch 75. This limit switch 75 is adapted to control a solenoid 73 for reciprocating a valve element 74 connected through a conduit 76 to a fluid pressure supply conduit 77 receiving fluid from a suitable source (not shown). The conduit 76 communicates with a drain line 78 through a second control valve 79 normally connecting the line 78 to atmospheric pressure. Interposed in the line 76 intermediate the valve 74 and the source line 77 is a restricted orifice 80 serving as a pressure reducing means, whereby the pressure of the source in the line 77 is reduced for introduction through line 76 and check valve 81 to a supply line 82 which communicates with the neck core passage 63 (FIGURE 2).

The supply line 82 is also connected to the source line 77 through a second valve 83 controlled by the solenoid 84 energizable through a timer 85 forming a part of the control circuit for the forming apparatus. It will be noted that the valve 79 is normally open and can be closed by the actuation of either of two solenoids, including solenoid 86 actuatable upon energization of the solenoid winding 73 by the limit switch 75 and a second solenoid winding 87 which is energizable from the timer 85 along with the solenoid winding 84.

As hereinbefore explained, the blank 60 can be tailored to the configuration of the final article. Particularly troublesome are those bottle shapes or designs which are non-circular in transverse section and also those bottle designs which are of varying transverse contour along their length. For example, the container or bottle of FIGURE 4 of the drawings is elliptical in cross-section, and the cross-sectional dimensions of the bottle initially increase and then decrease downwardly along the axis of the article.

The conventional or normal blank from which containers have been made, for example as described in U.S. Patent No. 2,804,654 assigned to the assignee of the present invention is of a uniform radial diameter substantially the same as the diameter of the injection molded finish 92. In the blowing of an elliptical shape from such a circular blank, the introduction of blow air expands the cylindrical tube uniformly radially and also substantially uniformly axially. The chilling effect of the massive blow mold walls on the tube can be readily comprehended, and those portions of the blank which first contact the mold walls will be immediately chilled and set with further blowing having no appreciable effect upon the wall thickness. Consequently, in such conventional forming and blowing techniques, the wall thickness of the article portion contacting the mold at any given point is inversely proportional to the distance at which that point lies from the vertical axial portion of the tube. Consequently, the wall thicknesses of finished articles of non-circular cross-section vary substantially.

By initially blowing at least a portion of the tube, as herein proposed, to a contour different from and to a diameter greater than that of the extrusion orifice, the distance which must be traversed by the plastic tube portions during the final blowing is substantially reduced and the wall thickness of the blank much more nearly approaches that of the final article. As a consequence, substantially uniform wall thickness is maintained throughout the finished article.

Further it is advantageous to locally expand the tubular blank axially of its length so as to conform the blank axially to the axial contour of the blow mold and of the finished article. The same advantages of uniform wall thickness, less distance of travel to contact the mold walls, and a closer correlation between the wall thickness of the blank and the finished article are obtained.

The chilling effect of the ambient atmosphere upon the tube extruded into the open is also well known. At the moment that the article blank is expressed from the orifice 35, it is readily expandable, and it is essentially plastic in nature uniformly throughout its thickness. After even momentary exposure to the atmosphere, the expandability is restricted substantially by the formation of an exterior "skin" of chilled material at the outer periphery of the blank. This outer skin does not prevent the subsequent blowing of the tube at relatively high pressures, i.e., of the order of 100 lbs. per sq. in., but the susceptibility of the tube to blowing at substantially lower pressures, i.e., is on the order of 1 to 10 lbs. per sq. in., is substantially reduced.

Bearing in mind the desirability of conforming the blank in both axial contour and cross-sectional shape to the corresponding dimensions of the blow mold and the final article, and the susceptibility of plastic material to blowing at relatively low pressures immediately after its issuance from the extrusion orifice 35, FIGURES 2–16 illustrate various types of blanks which may be pre-blown for better conformity to the final container shape.

Figure 4:
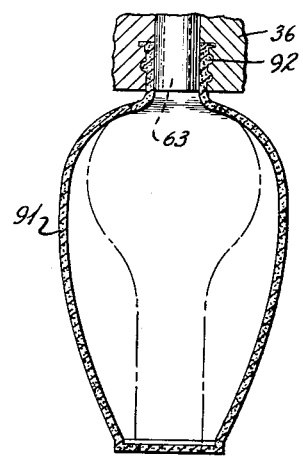
FIGURE 4 illustrates the finally blown article made by the blank and mold of FIGURES 2 and 3.

In FIGURE 4, it will be seen that the illustrated form of bottle is oval in cross-section and is of an exterior contour which axially diminishes progressively downwardly from a maximum closely adjacent to the upper finish 92. FIGURE 1 illustrates an apparatus for forming a blank 60 well adapted for blowing to the contour of FIGURE 4.

It will be seen that the limit switch cam 70 contacts the limit switch actuation arm 72 during the initial extrusion of the blank 60. Consequently, the valve 74 is actuated to interconnect the lines 76 and 82 and to disconnect the exhaust line 78 during the initial extrusion of the blank. Thus, air at relatively low pressure is introduced through the line 82 and the neck mold passage 63 during the initial formation of the blank 60 and a bulbous, radially outwardly distended portion 60A is formed therein. After approximately ⅓ to ½ of the vertical travel of the neck mold 36 has occurred, the limit switch arm 72 rides off the cam 71 and the blowing is interrupted. Further, the energization of the solenoid 73 and 86 will result in venting of the conduit 82 and the interior of the blank 60 at atmospheric pressure. Consequently, no further blowing of the blank will occur and a lower tubular extension 60B of substantially the diameter of the orifice 35 will be formed.

The pressure introduced through line 82 is such that the maximum expanded diameter of the blank portion 60A will be slightly less than the maximum interior diameter of the blow mold cavity defined by the cooperating cavity heads 90 formed in the blow molds 61. Upon subsequent actuation of the cylinder 63 and movement of the blow molds 61 to their closed positions, it will be seen that the closure of the blank 60 will occur and that the blank expanded portion 60A does not contact the mold cavity portions 90. At the same time, the expansion of the blank 60 is such that the wall thickness of the expanded portion 60A thereof much more closely approaches the wall thickness of the finally expanded and formed article 91 than does the wall thickness of the lower reduced extruded portion 60B.

Also, it will be noted that the elliptical mold space defined by the mold cavities 90 possesses a minor axis 92 and a major axis 93, and that the diameter of the expanded portion 60A substantially approaches the dimension of the minor axis 92, and that the dimensional difference between the diameter of the expanded portion 60A and the major axis 93 has been substantially reduced.

Figure 5:
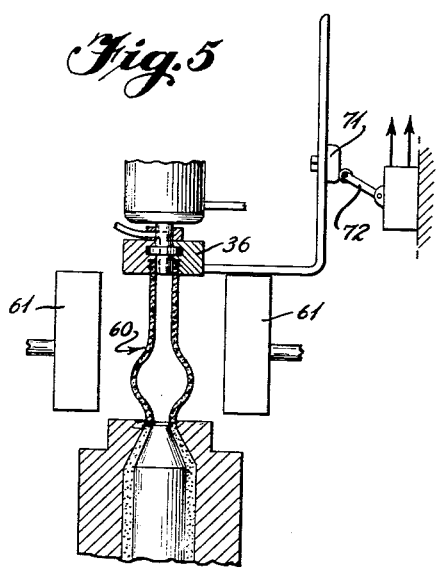
FIGURE 5 is a fragmentary schematic view illustrating the formation of a differently modified blank.
Figure 6:
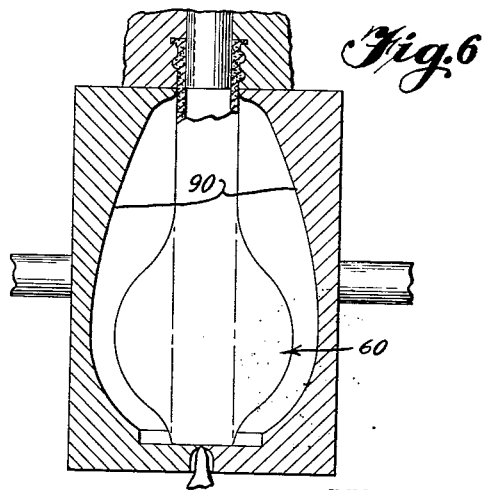
FIGURE 6 is a view of the modified blank, blow mold and injection mold similar to FIGURE 2.

Turning now to the embodiment of FIGURES 5–7, it will be seen that the shape of the final container 95 is substantially the reverse of the container 91 heretofore described. Consequently, the cam surface 71 does not contact the limit switch actuation arm 72 until the extrusion of the blank 60 has been substantially completed. By the time that the pre-blow air is introduced into the blank, the upper previously extruded portions of the blank have been exposed to the atmosphere and have become substantially more resistant to over-all distension or expansion. Consequently, the primary expansion occurs at the extrusion orifice in those portions of the tube being extruded while the pre-blow air is on. Accordingly, the tube 60 is expanded as at 60C for better conformity to the mold cavities portions 90.

As illustrated in FIGURE 8, expansion of the tubular blank 60 may be delayed until after the extrusion is complete. After the extrusion has been completed and all portions of the tubular blank have had an opportunity to "surface harden" or form the chilled peripheral skin thereon, the expansion requires a pressure somewhat higher than those pressures utilized in conjunction with the embodiments of FIGURES 1–7, inclusive, and the expansion occurs more uniformly along the length of the extruded blank 60. Accordingly, because of the retention of the axial ends of the blank by the neck mold 36 at the upper end and the elements defining the orifice 35 at the lower end, expansion occurs substantially medially of the blank, as at 60D.

The difficulty of uniformly radially expanding the tube to the final blowing operation becomes more difficult as the cross-sectional shape of the final container becomes less circular. One of the most difficult forms of container to properly form by the method of the present invention and one of the most difficult in which to obtain uniform material distribution is that illustrated in FIGURES 10–13, inclusive, wherein the container is rectangular in configuration. The cross-sectional shape of the container conforms to that of the mold cavity which, as illustrated in FIGURE 12, includes rounded shoulders 100 defined by the intersection of mold cavity surfaces 101 and 102, these corners 100 being located a substantial radial distance from the center line of the extruded tube. During normal blowing of a cylindrical tube, the plastic material portions defining the corners 100 would be the last to contact the mold walls. The previous chilling and setting of the article walls would leave little material for the article corners, thus substantially reducing the overall container strength.

The solution to this problem is well illustrated in FIGURES 10 through 12, wherein it will be seen that the blank 60 originally formed is inflated to a much greater extent than those embodiments of the invention previously shown and to such an extent that closure of the mold halves 61 on the inflated blank 103 would cause folding of the blank upon itself and the formation of an undesirable container. In blowing the expanded blank 103, it will be appreciated that pressures much in excess of those utilized in the earlier embodiment of the invention must be provided. Accordingly, pressures substantially in excess of atmospheric pressures are used.

In forming the blank 103, the pre-blowing is accomplished after full extrusion of the tube 60 and then this pressure is released by venting the interior of the blank 103 to atmosphere, thus allowing the blank to collapse to a configuration illustrated in FIGURES 11 and 12. At the same time that the pressure is released, the neck mold 36 is preferably moved vertically from the orifice 35 through an additional distance, thereby stretching the blank 103 as it is allowed to collapse by the release of the internal air pressure. As a result of the simultaneous release of the air pressure and stretching of the blank 103, the blank collapses and assumes the corrugated configuration as best shown in FIGURE 12 in which the wall thickness of the blank is substantially that of the inflated blank 103 while the radial dimensions of the blank are substantially reduced, thereby allowing closure of the mold halves 51 thereon without contact between the blank and the mold walls.

Thus, the effect of wall stretching is obtained, the wall thickness of the finished blank of FIGURE 12 is substantially the wall thickness of the finished article 110 of FIGURE 13, and sufficient material is provided in the collapsed blank to insure the presence of adequate material at the difficultly reachable corners 100.

By utilizing the apparatus shown in FIGURE 14 of the drawings, even more complex shapes may be attained. The utilization of a plurality of limit switch actuating cams 71A and 71B provide means whereby sequential blowing and the formation of sequentially expanded blank portions may be attained. Thus, even a difficultly formable container having a reduced waist may be formed by successive blowing operations and the two radially expanded portions 60E and 60F are provided on either side of the waist.

While preferred embodiments have been described above in detail, it will be understood that numerous modifications might be resorted to without departing from the scope of the invention as defined in the following claims.

I claim:

1. In a method of making a plastic container having a reduced neck portion and an enlarged body portion by the injection molding of the neck portion and the extrusion of an initial body blank having peripheral walls of tubular shape through a restricted orifice of substantially the size of the reduced neck, followed by the enclosure of the body blank in a mold defining a cavity of the size and contour of the enlarged body portion, the steps of injecting through the molded neck portion into the initial body blank as the blank is retained between the orifice and the neck portion a gas at a predetermined relatively low pressure greater than atmospheric pressure for a predetermined period of time intermediate the injection molding of the neck portion and the enclosure of the body blank to distend the tubular peripheral walls of the blank radially outwardly and to modify the initial blank by increasing its size to a size greater than that of said orifice but less than that of said mold cavity, thereby more closely conforming the wall thickness of the blank with that of the final article, and subsequently inflating the modified blank at a predetermined relatively high pressure for a predetermined period of time after enclosure of the blank by said mold.

2. In a method of making a non-cylindrical plastic article by extruding a cylindrical tube through an extrusion orifice and subsequently blowing the tube at a blowing pressure in an enclosing mold having a non-cylindrical mold cavity defining the blown article, the improvement of injecting a gaseous medium at less-thanblowing pressure into said tube prior to the closure of said mold to locally expand the tube radially to a non-cylindrical configuration and a thinner wall dimension conforming generally to the shape and wall dimension of the finished article, said expanded tube having a configuration such that it fits into the mold cavity without contact upon closure of said mold.

3. In a method of making a plastic container having finish of relatively small maximum diameter and a body of substantially greater size, the steps of molding the finish, forming a tube integral with the finish and of an initial diameter substantially the same as the diameter of said finish, supporting the tube at each end thereof, injecting a gaseous medium at greater than atmospheric pressure into the supported tube through the finish to radially outwardly distend local portions of the tube peripheral walls intermediate the ends thereof to a maximum diameter intermediate the size of the finish and the minimum dimension of the body, enclosing the distended tube in a blow mold without contacting the distended tube portions, and blowing the distended tube to final form.

4. In a method of making a plastic container having a reduced neck portion of circular cross-section and an enlarged body portion of non-circular cross-section by the injection molding of the neck portion and the extrusion of an initial body blank of circular cross-section through a restricted annular orifice of substantially the diameter of the reduced neck, followed by the enclosure of the body blank in a mold defining a cavity of the size and contour of the enlarged body portion and the blowing of the blank in the mold, the step of injecting into the initial body blank through the injected neck portion a gas at a predetermined relatively low pressure greater than atmospheric pressure for a predetermined period of time intermediate the injection molding of the neck portion and the enclosure of the body blank to distend the peripheral walls of the blank radially outwardly and to modify the initial blank by increasing its size to greater than that of said orifice and less than the least cross-sectional dimension of said body portion, and supporting the tube at its remote ends during the injection of said gas.

5. In a method of making a plastic article the steps of injection molding of a finished portion of said article, extruding of an initial blank of tubular shape, injecting into said initial blank during extrusion through the finished portion a gas at a predetermined relatively low pressure greater than atmospheric pressure for a predetermined period of time to radially outwardly enlarge the blank and to modify the tubular shape of the initial blank, supporting the initial blank at each end thereof during extrusion and injection of said gas, enclosing the modified body blank in a mold defining a cavity of the size and contour of the remainder of said article and of a minimum dimension less than the maximum dimension of said modified body blank, and subsequently inflating the modified blank at a predetermined relatively high pressure for the remainder of the article in said mold.

6. In a method of making a plastic article by blowing a blank in an enclosing mold, the steps of extruding a tube having an open leading end through an extrusion orifice into the open air, supporting said open tube end to maintain the same in axial alignment with said orifice and supporting the other end of said tube at said orifice, injecting a gaseous medium at a relatively low pressure in excess of atmospheric pressure through the open end of the tube into those portions of said tube exposed beyond said orifice during the extrusion step, thereby forming a non-uniform blank, enclosing said blank in said mold, and injecting a gaseous medium at a relatively higher pressure in said blank after enclosure of the blank in said mold.

7. In a method of making a plastic article by the steps of injection molding a finished portion of the article in an injection mold superimposed over an extrusion orifice, moving the injection mold away from the orifice while extruding a tube therethrough, and blowing the tube at a relatively high fluid pressure to the final configuration of the article in a mold cavity defined by an enclosing mold, the steps of injecting a gas at a relatively lower fluid pressure into the tube after complete extrusion of the tube to radially outwardly distend the tube peripheral walls, to dimensions greater than those of said mold cavity, collapsing the distended tube, and enclosing the collapsed tube in the mold.

8. In a method of making a plastic article, the steps of injection molding a finished portion of the article in an injection mold superimposed over an extrusion orifice; simultaneously moving the injection mold away from the orifice, extruding a tube through said orifice, and injecting a gas at a relatively low pressure in excess of atmospheric pressure through the injection mold into these tube portions immediately exterior to said orifice to radially outwardly distend said tube portions intermediate that portion filling the injection mold and that portion confined at the orifice; and subsequently blowing the tube at a relatively high fluid pressure to the final configuration of the article in an enclosing mold.

9. In a method of making a plastic container having finish of relatively small diameter and a body of substantially greater size, and of non-circular cross-section and having major and minor axes, the steps of forming a tube of an initial diameter substantially the same as the diameter of said finish, injecting a gaseous medium into the tube to radially outwardly distend the tube peripheral walls to maximum diameter greater than the diameter of the finish and greater than the minor axis of the body, collapsing the distended tube radially inwardly to a diameter less than the minor axis of the body, enclosing the collapsed tube in a blow mold, and blowing the tube to final form.

10. A method of making a plastic article by blowing a blank in an enclosing mold, the steps of forming the blank by extruding a tube of regular, relatively small diameter through an annular extrusion orifice, injecting a gaseous medium at a relatively low pressure into those portions of said tube exposed exteriorly of said orifice and prior to the enclosure of the tube by said mold thereby radially distending the tube to an exterior peripheral dimension approaching the peripheral dimension of the article, radially inwardly collapsing the distended tube, and injecting a gaseous medium at a relatively higher pressure into said collapsed tube after enclosure of the tube in said mold.

11. In a method of making a plastic article by blowing a blank in an enclosing mold, the steps of extruding a tube of constant cross-section through an orifice into the open air, maintaining at least atmospheric pressure in said tube during extrusion, injecting a limited volume of a gaseous medium at a relatively low pressure greater than atmospheric pressure into a portion of the tube exposed beyond said orifice, thereby forming a blank of non-uniform cross-section conforming more closely to the mold and of a wall thickness conforming more closely with that of the final article, enclosing said blank in said mold, and injecting a gaseous medium at a relatively higher pressure into said blank after enclosure of the blank in the said mold.

12. In a method of making a plastic article by the steps of injection molding a finished portion of an article in an injection mold superimposed over an extrusion orifice, moving the injection mold away from the orifice while extruding a tube of substantially constant cross-section therethrough into the open, the tube being supported at one end by the portion thereof confined in said injection mold and at the other end thereof by the portion confined by said orifice, and blowing the tube at a relatively high fluid pressure to the final configuration of the article in an enclosing mold, the steps of (1) substantially conforming the wall thickness of the tube with that of the article by injecting a gas at a relatively lower fluid pressure greater than atmospheric pressure through the article finished portion into the tube intermediate the injection molding step and the blowing step to radially outwardly distend the subsequently mold-enclosed portion of the tube peripheral wall while one end of the tube is connected to the finished article portion in the injection mold and the other end of the tube is connected to material in the orifice and (2) closing a separable blow mold on the distended tube to enclose the distended tube in an internal mold cavity having its least dimension greater than the maximum dimension of the distended tube.

13. In a method of making a plastic article by blowing an extruded blank in an enclosing mold, the steps of extruding a tube through an annular extrusion orifice, constantly restraining the free end of the tube in axial alignment with the orifice during and after extrusion, constantly restraining the other end of the tube by its joinder to material filling the orifice, injecting into said tube a limited volume of gaseous medium at a relatively low pressure greater than atmospheric pressure to radially expand the unrestrained medial portions of said tube previously extruded through said orifice and exposed therebeyond, said tube being expanded to a maximum dimension less than the minimum dimension of said article, enclosing said tube in said mold, and injecting into said tube a gaseous medium at a relatively higher pressure to expand said tube in the mold and to contact the tube with the mold for the first time.

14. The method of claim 13 in which the gaseous medium is injected into the tube to expand the same during extrusion.

15. The method of claim 13, in which the gaseous medium is injected into the tube to expand the same after the extrusion is complete and prior to enclosure of the element in the mold.

16. In a method of making a plastic article, the steps of injection molding a finished portion of an article in an injection mold superimposed over an extrusion orifice, moving the injection mold away from the orifice while extruding a tube therethrough, the tube being retained during and after extrusion at one end by the neck mold and at the other end by the orifice, injecting a gas at a relatively low pressure greater than atmospheric pressure into the retained tube to radially outwardly distend the unrestrained portion of said tube exteriorly of the orifice, enclosing the tube unrestrained portion in a mold having a cavity defined by wall surfaces spaced from the tube, and subsequently blowing the enclosed tube into initial contact with the mold cavity wall surfaces at a relatively high fluid pressure to the final configuration of the article in the enclosing mold.

17. A method of making a plastic article of irregular cross-section varying axially of the article by blowing a blank in an enclosing mold, the steps of forming the blank by extruding a tube of regular, relatively small diameter into the open air through an annular extrusion orifice, injecting a gaseous medium at a relatively low pressure greater than atmospheric pressure into said tube as it is extruded to radially distend localized portions only of the tube to a size greater than the smallest cross-sectional dimension of the article, and injecting a gaseous medium at a relatively higher pressure into said distended tube after enclosure of the tube in the mold.

18. In a method of making a plastic container having a reduced neck portion and enlarged non-cylindrical body portion by the injection molding of the neck portion and the extrusion of an initial cylindrical body blank having peripheral walls of tubular shape through a restricted orifice of substantially the size of the reduced neck, followed by the enclosure of the body blank in a mold defining a cavity of the size and contour of the enlarged body portion, the steps of injecting into the initial body blank through the neck portion thereof and during the extrusion a gas at a predetermined relatively low pressure greater than atmospheric pressure for a predetermined period of time less than the time of extrusion to locally distend the tubular peripheral walls of the blank radially outwardly from the extruded cylindrical shape and to modify the initial blank by increasing its size to a size greater than that of said orifice but less than that of said mold cavity, maintaining said gas under substantially atmospheric pressure during the remainder of the extrusion time, and subsequently inflating the modified blank at a predetermined relatively high pressure for a predetermined period of time after enclosure of the blank by said mold.

19. In a method of making a non-cylindrical plastic article having major and minor cross-sectional axes by extruding through an extrusion orifice a cylindrical tube having an open leading end and subsequently blowing the tube at a blowing pressure in an enclosing mold, the improvement of injecting a gaseous medium at less than blowing pressure and greater than atmospheric pressure through the opening leading end of said tube during extrusion of the tube to locally expand the tube radially to a non-cylindrical configuration having a greatest cross-sectional dimension less than the minor cross-sectional axis of the article and a wall thickness conforming more closely to that of the final article.

20. The method as defined in claim 11 wherein the injection of a limited volume of the gaseous medium takes place during extrusion of the tube.

21. The method as defined in claim 11, wherein the injection of a limited volume of the gaseous medium takes place after extrusion of the tube.

References Cited in the file of this patent
UNITED STATES PATENTS

| | | |
|---|---|---|
| 1,592,299 | Howard | July 13, 1926 |
| 2,349,177 | Kopitke | May 16, 1944 |
| 2,710,987 | Sherman | June 21, 1955 |
| 2,804,654 | Sherman | Sept. 3, 1957 |

FOREIGN PATENTS

| | | |
|---|---|---|
| 688,997 | Great Britain | Mar. 18, 1953 |